(12) United States Patent
Oldani et al.

(10) Patent No.: US 7,033,479 B2
(45) Date of Patent: Apr. 25, 2006

(54) ELECTROLYTIC CELLS WITH RENEWABLE ELECTRODES STRUCTURES AND METHOD FOR SUBSTITUTING THE SAME

(75) Inventors: Dario Oldani, Milan (IT); Antonio Pasquinucci, Milanese (IT)

(73) Assignee: De Nora Elettrodi S.p.A., (IT)

( * ) Notice: Subject to any disclaimer, the term of this patent is extended or adjusted under 35 U.S.C. 154(b) by 325 days.

(21) Appl. No.: 10/399,292

(22) PCT Filed: Oct. 30, 2001

(86) PCT No.: PCT/EP01/12537

§ 371 (c)(1),
(2), (4) Date: Apr. 15, 2003

(87) PCT Pub. No.: WO02/36857

PCT Pub. Date: May 10, 2002

(65) Prior Publication Data

US 2004/0020762 A1    Feb. 5, 2004

(30) Foreign Application Priority Data

Oct. 31, 2000  (IT) .......................... MI2000A2362

(51) Int. Cl.
*C25C 7/06* (2006.01)
*C25C 3/08* (2006.01)
*C25B 11/03* (2006.01)

(52) U.S. Cl. ...................... 205/334; 205/378; 205/389; 204/280; 204/286.1; 204/288.1

(58) Field of Classification Search ................ 204/242, 204/279–280, 265–266, 252–258, 290, 286.1, 204/288.1; 205/334, 378, 389
See application file for complete search history.

(56) References Cited

U.S. PATENT DOCUMENTS 4,116,805 A * 9/1978 Ichisaka et al. ........ 204/290.03
5,454,925 A * 10/1995 Garland et al. ............. 204/280
6,596,136 B1 * 7/2003 Gestermann et al. ....... 204/265

FOREIGN PATENT DOCUMENTS

JP          60-033891 A  *  2/1985

* cited by examiner

*Primary Examiner*—Roy King
*Assistant Examiner*—Lois Zheng
(74) *Attorney, Agent, or Firm*—Charles A. Muserlian

(57) ABSTRACT

The invention is relative to an electrolytic cell comprising electrodes spaced apart from the back-wall by means of ribs, wherein a portion of the contact surface between the electrodes and the ribs is free from constraints in order to permit the complete removal of the electrodes once they have to be replaced by removing only partially the original contact surface, so that positioning of the substitute electrodes is allowed on the residual portion. A method for substituting the electrodes of the cell which leaves the distance between the electrode surface and the back-wall unvaried is also disclosed.

14 Claims, 2 Drawing Sheets

ELECTROLYTIC CELLS WITH RENEWABLE ELECTRODES STRUCTURES AND METHOD FOR SUBSTITUTING THE SAME

This application is a 371 of PCT/EP01/12537 filed Oct. 30, 2001.

DESCRIPTION OF THE INVENTION

The present invention is directed to electrolytic cells with renewable electrode structures and to a method for substituting the same.

The use of planar electrodes formed by a substrate, in most of the cases foraminous, coated with one or more electrocatalytic materials is well known for electrochemical applications. The following description will mainly refer to electrode structures of this type, both anodic and cathodic, used in membrane electrolytic cells, as they represent a particularly significant case in the present scenario of industrial electrochemistry; however, it will be evident to the expert of the field that the same invention may be applied to other types of electrolysers and electrochemical cells in general, equipped with similar structural elements.

An example of membrane electrolytic cell using planar electrodes with an electrocatalytic coating is illustrated in U.S. Pat. No. 4,767,519. The electrode structure described therein comprises a conductive core provided on both faces with a projecting support structure, protected against corrosion by means of cold-pressed sheets adapted thereto and provided with peripheral sealing flanges; said sheets, in the areas corresponding to the projections of said support structure, whose surfaces lie substantially on the same plane, are bonded to electrodic meshes provided with an electrocatalytic coating. The projecting support structure may be obtained by pressing the sheets forming the core or, according to a more conventional embodiment, by fixing electroconductive spacers bonded to the core itself, for example by welding. It is further known that the same type of construction may be provided on only one side of the metal core with projections supporting one single electrode having an electrocatalytic coating. This is for example the case of electrolysers provided, on the opposite side, with gas diffusion electrodes, as in the depolarised electrolysis of hydrochloric acid, for example according to the procedure described in British patent application no. GB 2,010,908. A particularly advantageous construction in the case of electrochemical processes of this type is described in German patent application no. DE 198 50 071: in this case the ribs are made of undulated sheets arranged in order to form channels for the alternate upward and downward circulation of the fluids. The structure described in DE 198 50 071 as a half-cell may obviously also be applied in the opposite side to form a complete double side structure, which may be used in electrolytic processes not comprising gas electrodes. Of course many alternatives of the above embodiments are possible, according to the different uses to which the corresponding electrochemical cells are directed; in all cases however, referring to a half-cell, that is a single, either anodic or cathodic electrolytic compartment, the common elements are a back-wall, a support structure, made of projecting elements, so that at least part of the terminal portion of each projection lies on the same plane, and an electrode, or arrangement of electrodes, fixed to said terminal surfaces lying on the same plane, for example by welding. The electrodes are usually provided with apertures or openings, usually consisting of holes; for example the electrodes may consist of meshes, perforated sheets, expanded sheets or a superposition or combination of two or more of said elements; alternatively however, the electrodes may be made of whole sheets, or parallel strips, for example arranged on a plane or inclined with respect to the common plane, non-overlapping or partially overlapping, as is the case of the so-called "louver" or "venetian blind" configuration. The present invention is particularly useful in the case where said electrodes are at least partially provided with a catalytic coating, for example an electrocatalytic coating, as will be illustrated in the following description; however, it may be applied to any case where there is an occasional or periodical need for substituting at least part of said electrodes.

In the prior art solutions cited before, the problem of substituting the electrodes is rather critical. For example, in the case of electrodes made of a conductive non-catalytic substrate provided with an electrocatalytic coating, said coating may be subject to deactivation with time, due to consumption, detachment from the substrate, passivation of the substrate itself in the area contacting the electrocatalytic coating, or for other reasons. For example, in the case of sodium chloride electrolysis, both the electrodes, cathode and anode, are preferably constituted by non-noble and non-catalytic conductive metals, coated with an electrocatalytic film containing noble metals. For example, in the case of the anode, the substrate may be made of a valve metal, for example titanium, and the coating is typically made of an electrocatalytic film for chlorine evolution, for example noble metals and oxides thereof. The lifetime of such coatings is usually in the range of a few years, after which it is necessary to replace the electrode or reactivate the substrate. Also in this last case, the detachment of the electrode from the cell structure is necessary; the reactivation procedure in fact foresees the steps of a radical cleaning of the substrate, spraying of the catalyst precursor and high temperature thermal treatment, which cannot be carried out in situ. In some cases, as it happens with nickel cathodes coated with nickel and ruthenium oxide, the reactivation may be carried out by means of a galvanic process; also in this case, as it is obvious, the detachment of the electrode from the cell structure is compulsory. The detachment procedure may be carried out in different ways; for example, in the case of electrodes in the form of a thin mesh, the latter may be torn off from the support structure whereto it was previously welded. This type of solution is however scarcely advisable as it involves the risk of seriously damaging the projections of the support structure upon removing a portion thereof or deforming their profile. Moreover, it is inevitable that part of the electrode substrate or of the welding material remains adhered to the projections when the electrode is torn off, resulting in a loss of planarity which causes some serious problems for the subsequent application of a substitute electrode structure, unless expensive and scarcely practical operations for cleaning and restoring the cell structure are carried out.

A much more widespread technique, especially in the case of heavy structures, consists in cutting the electrode in correspondence of the areas adjacent to each projection of the support structure. In this way, portions of the deactivated electrode, typically in the form of strips, remain welded or otherwise fixed to the projections. The replacement electrode structure is subsequently applied to said residual portions of the electrode, rather than directly onto the ribs. In this way, it is evident that at each subsequent reactivation the distance between the active surface of the electrode and the back-wall is continuously increased by a thickness corresponding to the thickness of the electrode. As a logical consequence, at each subsequent reactivation it is necessary to provide for the substitution of the respective peripheral sealing gasket: it is in fact evident that in order to ensure the best performance, the cell design requires the external plane of the electrode to be at a well defined level with respect to the plane of the peripheral gaskets. The gasket replacement involves several disadvantages, in addition to the cost of the material per se; it is in fact necessary to have moulds of different thickness, each one bearing a remarkable cost. Furthermore, a higher thickness of the gaskets implies a greater creep under compression; this is particularly inopportune, for example, in the case of polymeric membrane electrolysers as an increased creep causes a higher stress on the membrane, interposed between said gaskets, and therefore a higher risk of rupture.

A compendium of the various procedures applied according to the prior art for substituting mesh electrodes in membrane electrolysers provided with projections such as ribs is illustrated in U.S. Pat. No. 5,454,925. According to an embodiment described therein and shown in the relevant FIG. 1, the deactivated mesh is cut in various ways, leaving a residual strip whereon a new activated mesh is welded. It is, in other words, a particular embodiment of the above described prior art, which is negatively affected by the increase in the distance between the cell back-wall and the electrode plane for each subsequent reactivation. It must be noted that, in the case of a membrane electrolyser, various reactivation cycles are to be effected during the cell lifetime, with the relevant variations in the distance between the back-wall and the electrode plane and consequently in the thickness of the respective peripheral gaskets. According to an alternative embodiment, the mesh is cut out completely, together with a portion of the projection whereto it is fixed; subsequently, as shown in a sequence in FIGS. 2, 3 and 4 of the cited document, an angular element is applied, which is made of a pre-assembled metal strip with a mesh welded at a right angle, or a mesh or perforated sheet bent at a right angle. The replacement electrode is subsequently welded onto the angular element. It is quite evident that this type of embodiment neither solves the problem of the increase of the distance between the back-wall and the electrode plane, nor the one of the cutting of the mesh. It also exhibits further shortcomings: the angular element, according to what shown in the figures, is difficult to obtain with the desired tolerance on the 90° angle between the surface which must be abutting to the projection and the surface supporting the electrode; in the case of a pre-assembled element obtained by welding a mesh onto a metal strip, the welding procedure with the necessary tolerances is evidently very delicate. In the case of a mesh or bent sheet, the resulting element is not sufficiently rigid as to ensure that a perfectly orthogonal bending is maintained. Furthermore, an even more important aspect is the complexity of the welding to be made in order to bond the angular element to the residual portions of the projection, which must be substantially continuous along the whole surface of the latter in order to ensure a sufficient electrical conductivity.

Even more disadvantageous and problematic appears the embodiment shown in FIG. 5 of the cited document, where the angular element is assembled in such a way that it does not use, as a guide, the preexisting angle on the projection, which is completely removed when the deactivated electrode is detached. In this way the welding of the angular element to the projection is even more difficult, as in addition to the above mentioned problems, the problem of maintaining, with very strict tolerances, the parallelism between the main axes of the projections and the main axes of the angular elements must be taken into account. The removal of the constraint consisting in the residual portion of the projection on the electrode plane, in other words, implies that the parallelism between the cell back-wall and the electrode plane may deviate in two directions: along the main axes of the projections as above mentioned and in the perpendicular direction with respect to said axis, when the orthogonality of the two main planes of the angular element is not provided. In both cases, the most evident consequence of said deviation is the risk of compression of the membrane at one end, up to the possible perforation, and an excessive membrane-electrode gap at the other end.

As a last remark, it must be noted that the procedures for substituting the electrodes illustrated in U.S. Pat. No. 5,454,925 can be applied only when the projections of the support structure consist of mutually separated spacers, while no indication is given for cell designs wherein the projections are made of continuous profiles, obtained for example by direct moulding of the conductive core, or of channels formed by undulated sheets as described in DE 198 50 071.

It is an object of the present invention to provide an electrochemical cell design with renewable electrode structures overcoming the drawbacks of the prior art. In particular, it is an object of the present invention to provide an electrolytic cell, comprising at least one renewable electrode structure consisting of a back-wall provided with an arrangement of projections, at least part of the terminal surfaces thereof lying on a common plane, and by an electrode or arrangement of electrodes put, either directly of by means of intermediate elements, in contact with said terminal surfaces lying on the common plane, characterised in that said electrode or at least part of the electrodes of said arrangement of electrodes are removable and replaceable one or more times with substantially equivalent electrodes while maintaining the original distance from the back-wall. Under another aspect, it is an object of the present invention to provide a method for substituting the electrodes inside an electrolytic cell, comprising the complete removal of the exhausted electrodes and the application of new electrodes, characterised by a simple cutting of the structure with the removal of the exhausted electrodes and welding of new electrodes onto the original contact surface.

According to a further aspect, it is an object of the present invention to provide a method for substituting the electrodes of an electrolytic cell, comprising the total removal of the exhausted electrodes and the installation of new electrodes, which may be applied to any design of cells provided with projections suitable for maintaining a fixed distance between the back-wall and the electrodes, said projections being made of mutually separated pieces, or by a suitably shaped continuous profile.

According to a further aspect, it is an object of the present invention to provide a method for substituting the electrodes of an electrolytic cell without any need for substituting any peripheral gasket, or by substituting the peripheral gaskets without modifying their thickness.

According to a particular embodiment, it is an object of the present invention to provide a method for substituting electrodes of an electrolytic cell without the need for cuttings or other damages to the removed electrodes.

The invention consists in an electrolytic cell comprising at least one renewable electrode structure consisting in a back-wall provided with at least one arrangement of projections delimited on the side opposite to the back-wall by terminal surfaces lying on the same plane, and by one electrode or one arrangement of electrodes in contact with said terminal surfaces lying on the same plane, thus defining a multiplicity of contact surfaces, characterised in that part of each of said contact surfaces is free from constraints and the electrode or arrangement of electrodes is fixed to said terminal surfaces of the projections, for example by welding, only in the peripheral regions of said terminal surfaces.

Under another aspect, the invention consists of a method for replacing the electrode or arrangement of electrodes with a substitute electrode or arrangement of electrodes in an electrolytic cell comprising at least one compartment consisting of a back-wall provided with at least one arrangement of projections delimited on the side opposite to the back-wall by terminal surfaces lying on the same plane, said electrodes to be replaced being in contact with said terminal surfaces lying on the same plane thus defining a contact surface, wherein at least part of each of said contact surfaces is free from constraints, and said electrodes to be replaced are fixed to said terminal surfaces of the projections, for example by welding, only in the peripheral regions of said terminal surfaces, characterised in that it comprises:

cutting part of said terminal surfaces of the projections so as to remove the portions fixed to said electrodes to be replaced, avoiding at the same time to remove a substantial portion of the terminal surface free from constraints, and positioning said substitute electrodes onto the portion of terminal surface of the projection which was not removed during the previous cutting, fixing said substitute electrodes to said residual terminal surface, preferably in a peripheral portion of said residual terminal surface.

These and other aspects of the invention are illustrated in the following examples, which however are not intended in any way to limit its extent which is defined only by the attached claims.

FIG. 2 shows the detachment of the exhausted electrode structure and FIG. 3 shows the positioning of the substitute electrode according to the invention.

FIG. 5 shows the detachment of the exhausted electrode structure and FIG. 6 shows the positioning of the substitute electrode according to the invention.

EXAMPLE 1

Figure 1:
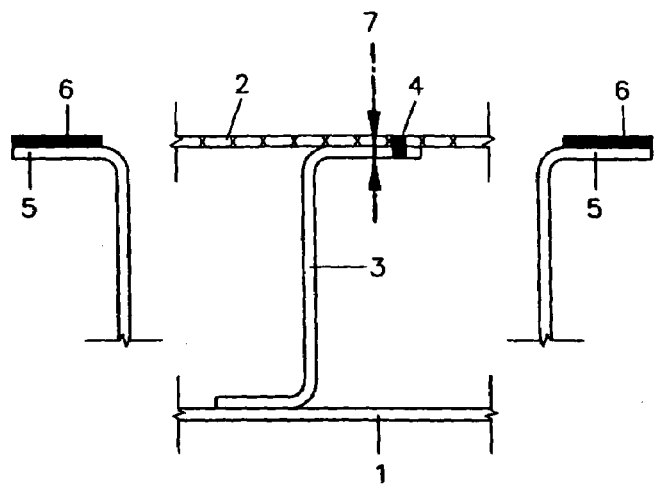
FIG. 1 is a side view of a first embodiment of the electrolytic cell of the invention.

A first embodiment of the electrolytic cell of the invention is shown in FIG. 1; in the renewable electrode structure, delimited by the back-wall (1), a planar electrode (2) is fixed at a predetermined distance through at least one projection (3), consisting in a spacer fixed to the back-wall, which constitutes a repeating support element. The electrode is fixed to the spacer by means of a constraint (4), for example a welding, which crosses the contact surface between the electrode and the terminal surface of the spacer, that is the surface of the spacer opposed to the back-wall. As shown in the figures, said constraint is positioned in a peripheral region of said terminal surface; the remaining part of the terminal surface of the spacer in contact with the electrode is not fixed to the latter at all, just abutting thereto. FIG. 1 shows also the peripheral flange (5) of the cell element, provided with a peripheral gasket (6). In the most common case, the flange and the back-wall are parts of a single structural element, shaped as a pan; in other embodiments, the flange and the back-wall may not be integrated in a single element and also other interposed elements may be present. The external surface of the electrode, that is the one not in contact with the spacer, is preferably at a defined and pre-determined level with respect to the external surface of the peripheral gasket. In a further preferred embodiment, the external surface of the electrode is at a defined level also with respect to the flange, in order to consequently define also the thickness of the gasket as per the previous description. According to the method of the invention for replacing the electrodes, when the electrode (2) must be replaced, for example because its catalytic coating is de-activated or for other reasons suggesting its substitution, the spacer (3) is cut along the line (7), thus permitting removal of the electrode. The cutting may be made from the outside, for example by means of a laser beam, by concurrently cutting the electrode in correspondence of the prolongation of line (7). The situation which takes place after removal of the electrode is shown in FIG. 2.

Figure 3:
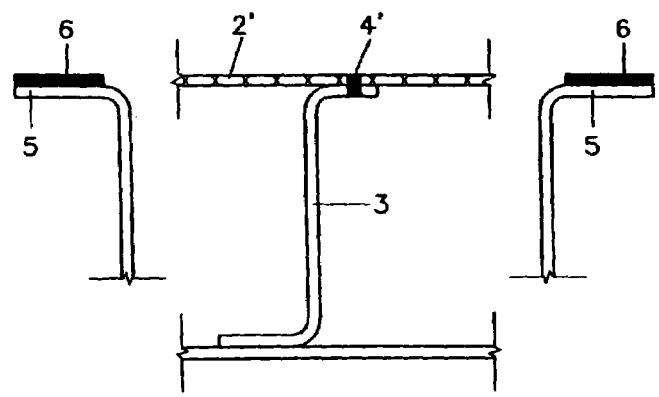

FIG. 3 shows the fixing of the substitute electrode (2') to the residue of the terminal surface of the spacer through a constraint (4'), for example a welding, preferably carried out in a peripheral region of the terminal surface of the spacer, leaving a considerable portion of the contact surface between the electrode and the spacer free of constraints; it is evident how, in this way, subsequent replacements are possible according to the above described method, by gradually removing small portions of the terminal surface of the spacer. Obviously the larger is the terminal surface of the spacer, the greater number of substitutions will be possible.

Figure 2:
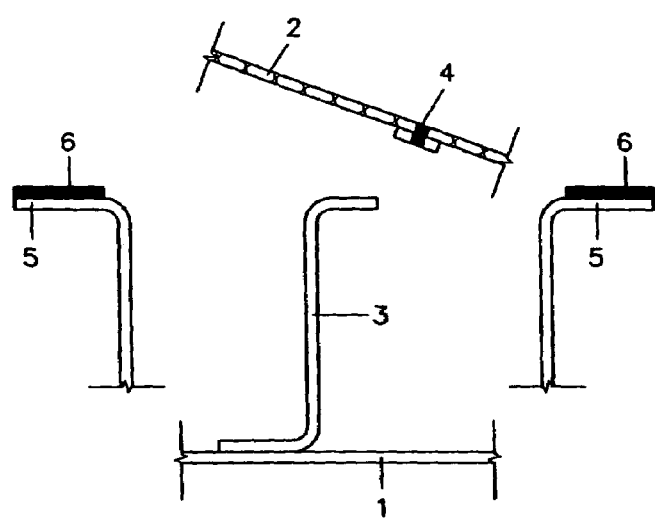
FIGS. 2 and 3 show the subsequent steps of the method for substituting the electrodes of an electrolytic cell of the invention according to the first embodiment; in particular.

FIGS. 1, 2 and 3 show a spacer with a particular shape, the profile of which may be likened to a Z; this shape is obviously only one of the shapes which permit to practice this particular embodiment of the invention, but also spacers whose profiles may be likened to a T, C, or reversed H or the like can be used as well.

As in some cases the terminal surface of the spacer may be rather large, it is normally advantageous to provide the same with apertures or openings such as holes or channels, especially when the electrodes are also perforated, for example in the form of meshes, perforated sheets, expanded metal sheets. In this way, the large contact area between the spacer and the electrode avoids to negatively affect the fluodynamics of the electrolytic cell and, in the case of membrane cells, mainly avoids local blinding of the membrane, and thus the establishment of dangerous gradients of concentration and current, which are often the cause of the local failure of the membranes.

EXAMPLE 2

Figure 4:
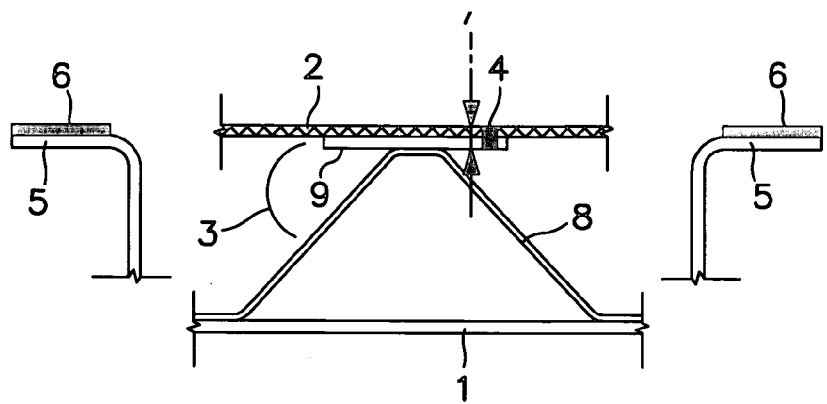
FIG. 4 is a side view of a second embodiment of the electrolytic cell of the invention.

A second embodiment of the electrolytic cell of the invention is shown in FIG. 4; in the renewable electrode structure, delimited by the back-wall (1), a planar electrode (2) is fixed at a predetermined distance through a projection (3) which constitutes the repeating support element. The projection (3) is made of two separate elements: the first, fixed to the back-wall, is made of a draw piece (8), for example an undulated sheet, which may form a channelling for the circulation of fluids according to the disclosure of DE 198 50 071. Alternatively, the draw piece (8) may be obtained with different geometries according to different procedures of the prior art, for example by cold-pressing of a sheet. The second element, fixed to the projecting part of the draw piece (8) for example by welding, is a planar element (9) which constitutes the contact surface of the projection. Said planar contact element (9) is preferably provided with apertures or openings, for example it is perforated or grooved, to avoid both blinding phenomena, in the case of membrane cells, and perturbations of the cell fluodynamics, according to the previous description.

Figure 5:
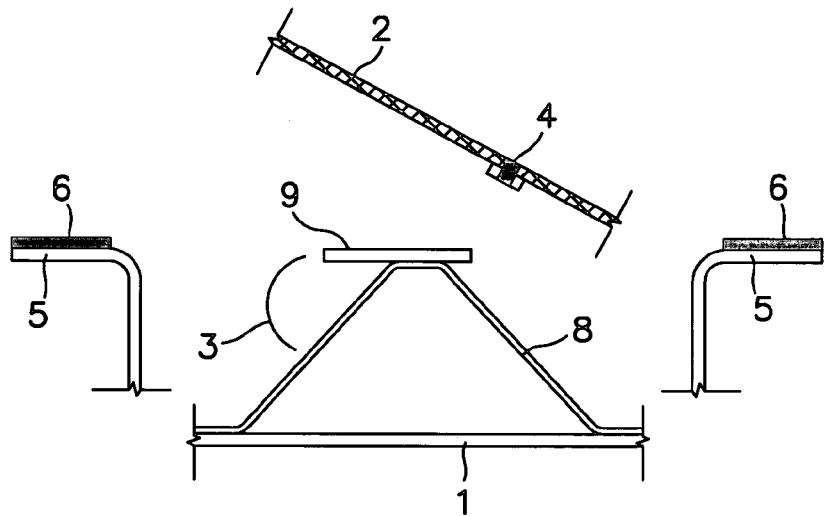
FIGS. 5 and 6 shows subsequent steps of the method for substituting the electrodes of an electrolytic cell of the invention according to the second embodiment; in particular.
Figure 6:
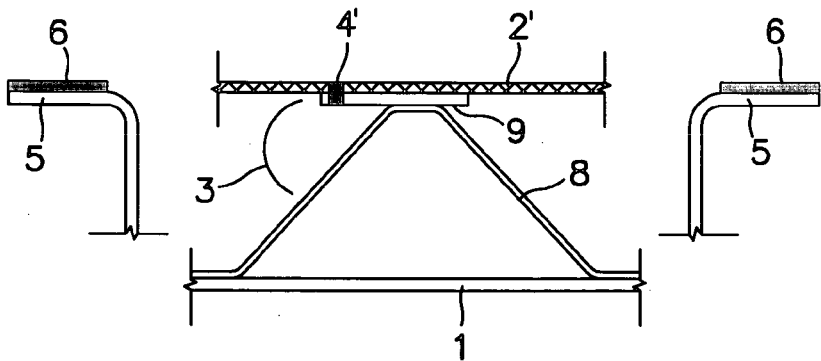

The electrode is fixed to each projection by means of a constraint (4), for example a welding, which crosses the contact surface between the electrode and the terminal surface of the projection, that is the contact surface between the electrode and the planar contact element (9). As shown in the figure, said constraint is positioned in a peripheral region of said terminal surface; the remaining part of the planar contact element (9) in contact with the electrode is by no means fixed to the latter but is simply abutting thereto. FIG. 4 shows also the peripheral flange (5) of the cell element provided with a peripheral gasket (6). Also here, in most cases, the flange and the back-wall are integral parts of a unique structural element, which may be likened to a pan; in other embodiments, the flange and the back-wall may also not be integrated in a single element and interposed elements may also be present. The external surface of the electrode, that is the one not in contact with the projection, is preferably at a fixed and pre-determined level with respect to the external surface of the peripheral gasket. In a preferred embodiment, the external surface of the electrode is at a fixed level also with respect to the flange, in order to define, consequently, the thickness of the gasket as previously described. According to the method for replacing the electrodes of the invention, also in the case of this second embodiment, when the electrode (2) has to be replaced, for example because its catalytic coating is de-activated or for other reasons which impose or suggest its replacement, the projection (3) is cut along line (7), thus permitting the removal of the electrode. The cutting may be carried out from the outside, for example by means of a laser beam, by concurrently cutting the electrode in correspondence of the prolongation of line (7). The situation which occurs after removal of the electrode is shown in FIG. 5. FIG. 6 shows the fixing of the substitute electrode (2') to the residue of the planar contact element (9) which coincides with the terminal surface of the projection, through a constraint (4'), for example a welding, preferably carried out in a peripheral region of the terminal surface of the spacer, leaving a substantial portion of the contact surface between the electrode and the spacer loose and free from constraints; it is evident how, in this way, subsequent substitutions are possible according to the above described method, by gradually removing small portions of the terminal surface of the spacer. Obviously the larger is the terminal surface of the spacer, the greater number of substitutions will be possible.

The invention claimed is:

1. A method for substituting an electrode of an electrolytic cell having at least one renewable electrode structure comprising:
    at least one back-wall provided with a support element made of projections delimited on the side opposite to the back-wall by a terminal surface, said terminal surfaces of said projections lying on the same plane
    at least one electrode in contact with said terminal surfaces of said projections, thereby defining a contact surface
    wherein a substantial portion of said contact surface is free from constraints and the at least one electrode is fixed to each of said terminal surfaces of said projections only in at least one peripheral region of said terminal surfaces with a substitute electrode, comprising removing said electrode to be replaced by cutting a portion of said terminal surface of said projections, wherein said cutting causes the removal of said peripheral region of said terminal surface of said projections fixed to said electrode, while avoiding the removal of at least a substantial residual portion of said terminal surface free from constraints, then placing a substitute electrode on said residual portion of said terminal surface of said projections by fixing said substitute electrode to said residual terminal surface of said at least one projection only in at least one peripheral region of said terminal surface.

2. The method of claim 1 wherein said cutting of said terminal surface of said projections is carried out concurrently with the cutting of the electrode to be replaced.

3. The method of claim 1 wherein said cutting is carried out by means of a laser beam.

4. The method of claim 1, wherein the distance of said substitute electrode from the back-wall is substantially unvaried with respect to the original distance of said electrode removed from said back-wall.

5. The method of claim 1, wherein said fixing of said substitute electrode to said residual terminal surface comprises a welding.

6. A method for replacing an electrode of an electrolytic cell having at least one renewable electrode structure comprising:
    at least one back-wall provided with a support element made of projections delimited on the side opposite to the back-wall by a terminal surface, said terminal surfaces of said projections lying on the same plane
    at least one electrode in contact with said terminal surfaces of said projections, thereby defining a contact surface
    wherein a substantial portion of said contact surface is free from constraints and the at least one electrode is fixed to each of said terminal surfaces of said projections only in at least one peripheral region of said terminal surfaces and said projections are mutually separated spacers, fixed to the back-wall with a substitute electrode, wherein the distance of said substitute electrode from the back-wall is substantially unvaried with respect to the original distance of said electrode removed from said back-wall comprising removing said electrode to be replaced by cutting a portion of said terminal surface of said spacers, wherein said cutting causes the removal of said peripheral region of said terminal surface of said spacers, while avoiding the removal of at least a substantial residual portion of said part of terminal surface free from constraints and then fixing a substitute electrode on said residual portion of said terminal surface of said spacers.

7. The method of claim 6 wherein said cutting of part of said terminal surface of said spacers is carried out concurrently with the cutting of the electrode to be replaced.

8. The method of claim 6 wherein said cutting is carried out by means of a laser beam.

9. The method of claim 6 wherein said fixing of said substitute electrode to said residual terminal surface comprises a welding.

10. A method for replacing an electrode of an electrolytic cell having at least one renewable electrode structure comprising:

at least one back-wall provided with a support element made of projections delimited on the side opposite to the back-wall by a terminal surface, said terminal surfaces of said projections lying on the same plane at least one electrode in contact with said terminal surfaces of said projections, thereby defining a contact surface wherein a substantial portion of said contact surface is free from constraints and the at least one electrode is fixed to each of said terminal surfaces of said projections only in at least one peripheral region of said terminal surfaces wherein said support element is made of a series of projections which comprise at least one draw piece which is an undulated sheet and at least one planar contact element fixed to the surface of said draw piece opposed to the back-wall with a substitute electrode, comprising removing said electrode by cutting a portion of said planar contact element, wherein said cutting causes the removal of said portion of said part of planar contact element free from constraints wherein the distance of said substitute electrode from the back-wall is substantially unvaried with respect to the original distance of said electrode removed from said back-wall and by fixing said substitute electrode to said residual portion of said planar contact element only in at least one peripheral region of said residual portion.

11. The method of claim 10 wherein said cutting of part of said terminal surface of said spacers is carried out concurrently with the cutting of the electrode to be replaced.

12. The method of claim 10 wherein said cutting is carried out by means of a laser beam.

13. The method of claim 10, comprising the application, subsequent to said removal of said electrode to be replaced, of a substitute electrode on said residual portion of said planar contact surface.

14. The method of claim 10, wherein said fixing of said substitute electrode to said residual portion of said planar contact element comprises a welding.

* * * * *